United States Patent [19]

Tsunoda et al.

[11] 4,046,683
[45] Sept. 6, 1977

[54] PROCESS FOR SEPARATING SUSPENDED METAL OXIDE AND METAL HYDROXIDE SOLIDS FROM A MOTHER LIQUOR

[75] Inventors: Shogo Tsunoda; Katsuyuki Kataoka, both of Yokohama; Toshinori Baba, Kawasaki, all of Japan

[73] Assignee: Ebara Infilco Kabushiki Kaisha, Tokyo, Japan

[21] Appl. No.: 686,195

[22] Filed: May 13, 1976

Related U.S. Application Data

[63] Continuation-in-part of Ser. No. 481,948, June 21, 1974, abandoned.

[30] Foreign Application Priority Data

Apr. 10, 1974 Japan .................................. 49-40779
Apr. 10, 1974 Japan .................................. 49-40780

[51] Int. Cl.² .......................... B01D 21/01; C02B 1/20; C02C 5/02
[52] U.S. Cl. .......................... 210/20; 210/49; 210/51; 210/53; 210/54; 210/DIG. 29
[58] Field of Search ................ 210/20, 42, 49, 51-54, 210/205, 206, 208, 219, 221 M, 536, DIG. 29

[56] References Cited

U.S. PATENT DOCUMENTS

| 3,171,800 | 3/1965 | Rice | 210/52 |
|---|---|---|---|
| 3,350,302 | 10/1967 | Demeter et al. | 210/51 |
| 3,377,274 | 4/1968 | Burke et al. | 210/53 |
| 3,388,060 | 6/1968 | Clark | 210/54 R |
| 3,403,096 | 9/1968 | Mackrle et al. | 210/20 |
| 3,481,868 | 12/1969 | Gilwood | 210/20 |
| 3,579,443 | 5/1971 | Horst | 210/219 |
| 3,637,491 | 1/1972 | Hedrick | 210/54 |
| 3,642,619 | 2/1972 | Losasso et al. | 210/52 |
| 3,660,284 | 5/1972 | Camp | 210/49 |
| 3,730,887 | 5/1973 | Suzuki et al. | 210/49 |
| 3,779,910 | 12/1973 | Chatfield | 210/49 |

*Primary Examiner*—Wilbur L. Bascomb, Jr.
*Assistant Examiner*—Ernest G. Therkorn
*Attorney, Agent, or Firm*—Blum, Moscovitz, Friedman & Kaplan

[57] ABSTRACT

An effective and efficient process and apparatus for treating a mother liquor including therein both suspended and dissolved impurities, and in particular, metal hydroxides, metal oxides and phosphate ions, at a concentration of less than 10 g/l, are provided. The process comprises admixing at least 0.5 ppm of an organic high molecular weight flocculating agent and after an interval at least 10 ppm of an inorganic metal salt flocculating agent therewith, subjecting the admixture to rotational flow to form a particulate layer of solids and simultaneously therewith, agitating the admixture, while maintaining the suspension liquor at a solids concentration of at least 10 g/l, and concurrently upwardly directing the suspension so that it flows through the agitated particulate layer and thereby intimately contacting flowing particles thereof for separating the particles from the treated mother liquor. A preliminary treatment removes dissolved matter including phosphate ions, and a clarified effluent results.

13 Claims, 4 Drawing Figures

PROCESS FOR SEPARATING SUSPENDED METAL OXIDE AND METAL HYDROXIDE SOLIDS FROM A MOTHER LIQUOR

CROSS REFERENCE TO RELATED APPLICATION

This application is a Continuation-in-Part application of our co-pending Application No. 481,948 filed June 21, 1974 for SUSPENSION SEPARATION PROCESS, now abandoned. This application is also related to co-pending Application Ser. No. 686,197 filed May 13, 1976 for A PROCESS FOR THE TREATMENT OF A COLLOIDAL SUSPENSION.

BACKGROUND OF THE INVENTION

The present invention relates to a separation process for removing suspended metal hydroxides, and metal oxides from a mother liquor containing these materials. Further, dissolved impurities including phosphate ions are also removed so that a clarified effluent is obtained.

Among conventional methods for precipitating our metal ions such as Al, Fe and Zn ions from aqueous solutions thereof is floccing their corresponding metal hydroxides by neutralization thereof to promote, respectively floccing and sedimentation thereof prior to their separation from the solution.

Another known method for removing phosphate ions and the like from suspensions, such as sewage, comprises flocculating with an inorganic metal salt flocculating agent such as aluminum sulfate or ferric chloride to the form of colloidal particles which promote floc growth and improve sedimentation thereof and then separating the floc from the liquid phase.

To further enhance the floc sedimentation rate, an organic high molecular weight flocculating agent may be added to the suspension for thereby increasing floc dimension and increasing the sedimentation rate thereof. Floc developed in this manner, however, is loose, particulate, contains substantial quantities of water therein and is characterized by low density, so that although the size thereof is large, a relatively low sedimentation rate and relatively poor dehydration properties result.

In yet another prior process it has been proposed to dehydrate sludge or a highly concentrated suspension having a solids concentration of from about 10 to about 500 g/l, by adding thereto at least 0.2 g of polymer/kg of solids of a high molecular weight flocculating agent, for instance a high molecular weight polyacrylamide, a partially hydrolyzed compound thereof or sodium polyacrylate, and separating the granulated solids from the liquid phase by fluid rotation at about 0.5 - 3 m/sec., while maintaining the solids concentration at about 30 - 500 g/l. According to this method, compact agglomerate granules are obtained which facilitates water-separation therefrom. However, these agglomerate granules do not form when the untreated water has a solids concentration of less than 10 g/l; when the solids concentration is below 10 g/l, it is necessary to coagulate the sediment and condense to a solids concentration of at least 10 g/l.

Accordingly, the above-described method is inapplicable to untreated water such as sewage which contains less than 10 g/l of suspended matter and dissolved matter, said suspended and dissolved matter being metal hydroxides, metal oxides, phosphate ions, and the like.

SUMMARY OF THE INVENTION

Generally speaking, in accordance with the invention, an effective and efficient process for treating a mother liquor having suspended therein, particularly, metal hydroxides, metal oxides, and dissolved therein metal hydroxides and phosphate ions at a total concentration of less than 10 g/l are provided. The process comprises admixing at least 0.5 ppm of an organic high molecular weight flocculating agent and after a selected interval, at least 10 ppm of an inorganic metal salt flocculating agent therewith and subjecting the admixture to rotational flow to form a particulate layer of solids and simultaneously therewith agitating the admixture, while maintaining the suspension liquor at a solids concentration of from 3 times that of the suspended solids in the mother liquor up to 150 g/l, and more particularly in the range from 1 g/l to 150 g/l, and concurrently upwardly directing the mother liquor so that said liquor flows through the agitated particulate layer, thereby intimately contacting flowing particles thereof for separating the particles from the treated mother liquor, the suspension containing metal hydroxides, metal oxides, dissolved inorganic substances, color bodies and phosphate ions being thereby clarified.

Accordingly, it is an object of the instant invention to provide a process for separating suspended solids from a mother liquor wherein the matter suspended in the untreated mother liquor has an initial concentration of less than 10 g/l and the make-up thereof is substantially suspended metal hydroxides and metal oxides, and dissolved metal hydroxides, color bodies and phosphate ions.

Another object of the invention is a process including a granulation step which provides coarse, granular, substantially spherical, agglomerated particles having substantially superior characteristics to conventional floc derived from conventional processes.

A further object of the invention is to provide a separation step for separating agglomerated granules at a predetermined velocity for thereby providing a substantially clear filtrate liquor.

Yet another object of the invention is to provide a process wherein the agglomerated particles are separated from the mother liquor at a rate 5 to 10 times faster than conventional processes, while providing a highly condensable sludge with excellent dehydration properties.

It is still another object of the invention to provide a separation process wherein the supernatant liquor is substantially free of residual inorganic and high molecular weight flocculating agents, so as to prevent secondary pollution of water into which the supernatant is introduced.

An important object of the present invention is a process for effectively separating a mother liquor containing solid metal hydroxides and oxides in suspension and possibly metal ions and phosphate ions in solution into a clarified effluent and a granular product which can readily be subjected to hydroextraction for the removal of the major portion of the water therein and to produce a cake.

Still other objects and advantages of the invention will in part, be obvious and will in part, be apparent from the specification.

The invention accordingly comprises the several steps and the relation of one or more of such steps with respect to each of the others, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
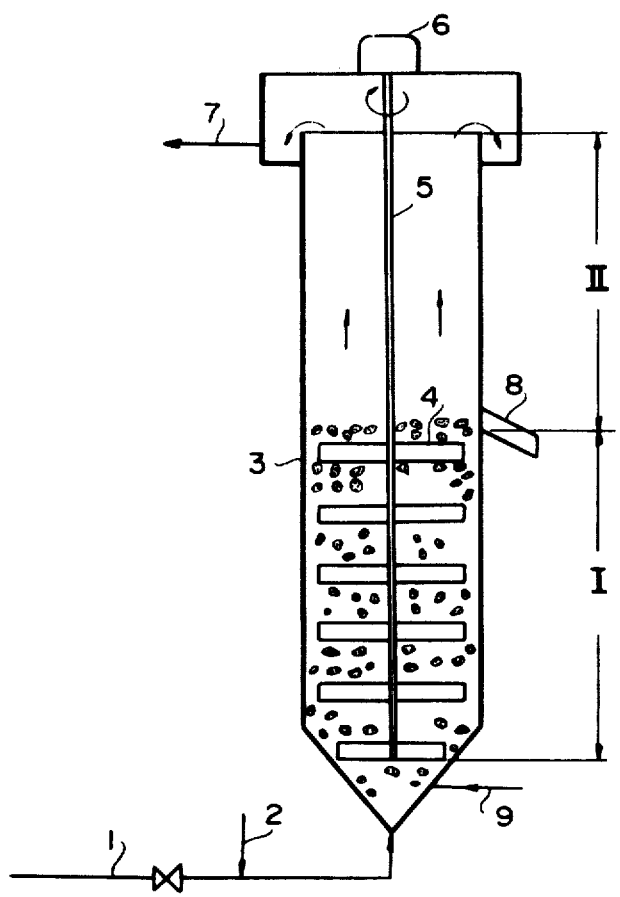
FIG. 1 is a schematic cross-sectional view of an apparatus which may be employed to carry forward the instant process according to the invention.

The process of the present invention is directed to removal of suspended inorganic impurities from raw water and employs organic high molecular weight flocculating agents which promote bonding among suspended solids by the reaction thereof with an inorganic metal salt flocculating agent, under predetermined process conditions. Suitable organic high molecular weight flocculating agents that may be employed in the practice of the invention include polyacrylamide, a partially hydrolyzed polyacrylamide, sodium polyacrylate and like reagents.

Similarly, the inorganic metal salt flocculating agents employed in the practice of the instant invention are reagents which promote coagulation and destabilization of solids in a suspension. Suitable inorganic flocculating agents that may be employed in the practice of the invention include aluminum sulfate, polyaluminum chloride, ferric sulfate, ferric chloride, ferrous sulfate, magnesium carbonate and other like reagents.

It is found that a specific relationship exists between the molecular weight of the organic high molecular weight flocculating agent employed in the process and the degree to which the suspended solids are granulated. For satisfactory granulation, it is found that the molecular weight thereof should be at least 500,000, preferably more than one million, and most preferably from about 5 to 6 million. Optimal granulation occurs when the organic high molecular weight flocculating agent has a molecular weight of between 5 and 6 million.

A suitable device for practicing the process includes a closed vessel, means connecting the closed vessel with an untreated water, i.e., mother liquor, supply, a charge conduit connected to said means for introducing a high molecular weight organic flocculating agent into the untreated water supply carried in said means, said organic flocculating agent, hereinafter referred to as "OFA" being added to coagulate said suspended solids, a second charge conduit connected to said vessel for introducing an inorganic flocculating agent, hereinafter referred to as "IFA", into the treated water for converting said coagulated solids to floc, an outlet in the top of the vessel through which the clarified supernatant leaves the vessel and means for granulating the flocced solids and separating the suspended solids from the mother liquor which include means for agitating the treated mother liquor and solids suspended therein in a predetermined manner whereby the suspended particles granulate and coalesce into a fluidized layer while the clarified supernatant rises upwardly in the vessel and into the outlet therefor. The means for agitating the suspension liquor and granulating the solids suspended therein include a stirrer mounted in the vessel having substantially parallel stirring vanes arranged in multistages on a central shaft and perpendicularly thereto, said shaft being mounted for rotation and rotating said vanes at controlled rate. The vessel includes an outlet for excess granulated particles collected in the interface of the fluidized layer of granulated particles and clarified layer of supernatant.

Referring now to FIG. 1, untreated water containing suspended metal hydroxides and/or oxides is conducted through a feed conduit 1, charged with from 0.5 ppm to 20 ppm of an OFA which is introduced into the untreated water through a charge conduit 2, and introduced under pressure into the bottom of a treating vessel 3. Vessel 3 includes two zones, an underlying granulation zone I and an overlying clear water zone II. A means is located in the granulation zone for producing a rotational current therein. The means includes an impeller and preferably a plurality of impellers 4 located in the granulation zone and sequentially arranged thereon on a shaft which is operatively connected to a controllable-speed driving means 6 for generating a rotational current in granulation zone I. The untreated water having been charged with organic high molecular weight flocculating agent is circulated in the granulation zone by impellers 4, while from 10 to 300 ppm of an IFA is introduced therein through an inlet tube 9 to promote strong bonding by the synergistic effect thereof with the OFA. Thus, the suspended matter is converted to granules within granulation zone I, while the supernatant is carried upwardly into clear water zone II and cycled out of vessel 3 into outlet conduit 7 through an outlet port provided in vessel 3. In granulating zone I, the suspended solids are formed into substantially spherical particles by the fluidization phenomenon generated therein by the interaction of the upward current and rotational flow provided by impellers 4. Excess granules are discharged from vessel 3 through an outlet 8 at the top of granulating zone I.

Figure 2:
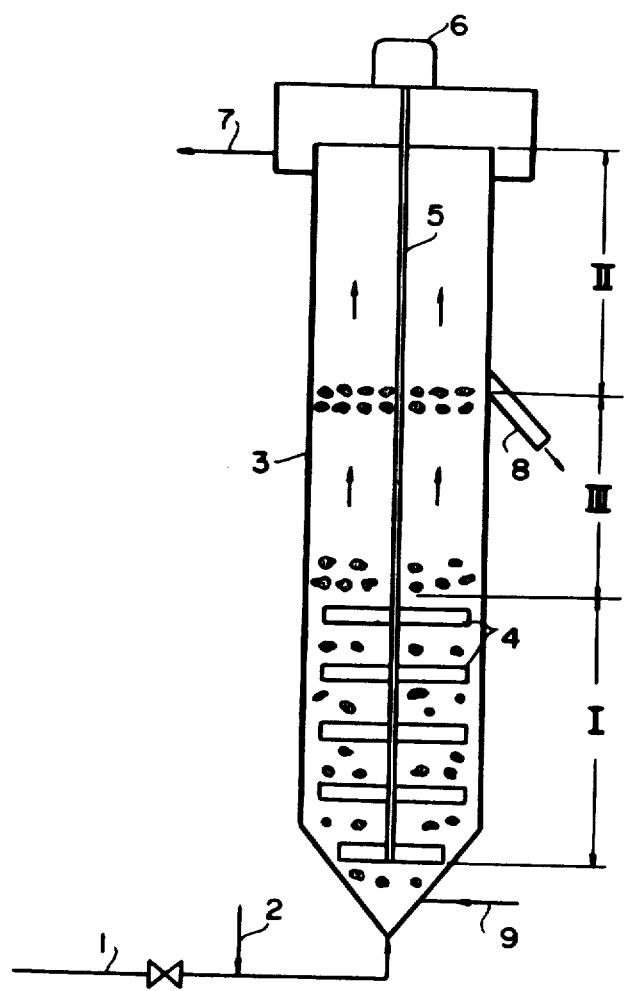
FIG. 2 is a schematic cross-sectional view of another apparatus embodiment which may be employed for performing the process in accordance with the invention.

Referring now to FIG. 2, another device for granulating and separating suspended solids includes a vessel 3 having three internal zones, a granulating zone I, an expansion zone III for granulated particles and a collection zone II for clarified supernatant. A substantially constant layer of granulated particles if formed at the interface of granulating zone I and expansion zone III and fine granulated particles rising upwardly in granulating zone I are entrapped by the filter effect thereof for thereby providing more stable and clearer water than is obtained in a column 3 wherein provision is not made for the formation of such a layer. The blanket layer can extend up to the level of outlet 8, the extended thickness of said layer providing for enhanced degree of removal of suspended floc.

In treating aqueous suspensions of metal hydroxides and oxides, it is found that the metal hydroxides and oxides are substantially coagulated by the OFA; therefore, it is critical to add the OFA to the aqueous suspension before the addition of IFA thereto. When the untreated liquor contains iron hydroxide, for instance, the OFA is introduced into feed conduit 1 through charge conduit 2, referring for instance to FIG. 1, for completely coagulating iron hydroxide, and subsequent thereto, IFA is introduced into vessel 3 through charge conduit 9 for fluidizing the floc particles under agitation for thereby obtaining the desired spherical particles.

It is essential that the IFA not be added prior to completion of coagulation of the suspended matter by the OFA. If a sufficient interval is not provided, the added IFA will react with residual OFA so that the full quantity of OFA is not available for coagulating the suspended matter. In general, the interval between adding the OFA and the IFA should be between about 5 seconds and about 4 minutes. Preferably, the interval should be between about 10 seconds and about 3 minutes.

When the aqueous suspension contains dissolved metal and phosphate ions, a suitable reagent is preferably selectively admixed therewith for precipitating out the contaminants before the addition thereto of the organic high molecular weight flocculating agent. Suitable examples of chemical reagents which may be employed to react with the soluble materials in the mother liquor to form insoluble precipitate therewith include slaked lime, sodium carbonate, aluminum sulfate, ferric chloride, ferric sulfate, oxygen (air), chlorine gas, and like known reactants. The use of air to convert ferrous ion to ferric ion is particularly desirable since ferric hydroxide is insoluble and no impurity is introduced thereby. Where metal salts are added for precipitation of ions from solution, the quantity added must not greatly exceed the amount necessary for essentially complete precipitation, since otherwise the excess metal salt will act as an IFA added prior to addition of the OFA. Where the metal salt added is correct in quantity it will act only to precipitate out the ions and will not form a floc which cannot be granulated without addition of excessively great quantities of OFA and IFA thereafter.

Figure 3:
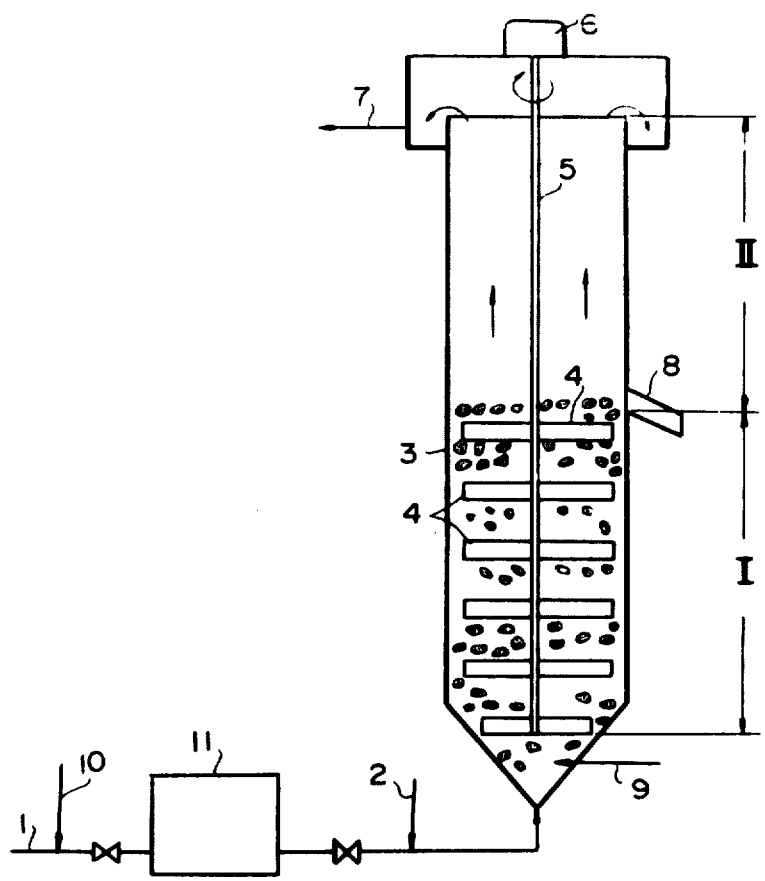
FIGS. 3 and 4 are respectively schematic cross-sectional views of still other apparatus embodiments which may be employed to perform the process in accordance with the invention.

The untreated water may, for instance, comprise an aqueous organic liquor containing less than 10 g/l of suspended matter and/or metal and phosphate ions. Referring now to FIG. 3, a small but effective amount of a suitable chemical reagent as listed above is introduced into feed conduit 1 through reagent charge conduit 10 and reacts therewith in a reaction tank 11 for thereby producing a suspended precipitate. The holding time in the reaction tank 11 should be from about 5 seconds to about 8 minutes and is preferably from about 10 seconds to about 5 minutes. Also, it is desirable that a stirrer or other agitation means be associated with reaction tank 11. Additionally, where oxygen or chlorine are used to precipitate the metal ions, conduit 10 can be positioned for introducing the gases into reaction tank 11 directly, this arrangement not being shown in either of the FIGS. 3 and 4.

After a suitable reaction time in tank 11, the liquor containing the original suspended matter and matter precipitated out in tank 11 is reintroduced into feed conduit 1 and at least 0.5 ppm of an OFA is introduced therein through charge conduit 2. The OFA admixes with the mother liquor, absorbs onto the suspension and the reaction product and coagulates same, and the admixture is fed, under pressure, into granulation zone I, the pressure urging the mother liquor and coagulated material upwardly therein. Vessel 3 in this embodiment includes the two zone interior arrangement, as described in connection with FIG. 1, i.e., an underlying granulation and separation zone I and an overlying supernatant collection zone II. Additionally, the same prevailing rotating upward flow is provided therein by impellers 4 operatively connected to driving motor 6 through connecting shaft 5. After the admixture of waste water and OFA is introduced into the granulation zone at least 10 ppm of an inorganic metal salt flocculating agent are admixed therewith through conduit 9 for promoting strong bonding power by the synergistic effect thereof with the OFA admixed in the mother liquor. The time interval between adding the OFA and the IFA is the same whether or not a reagent has been added to remove metal and phosphate ions from the solution. In other words, the time interval between adding the OFA and the IFA is between about 5 seconds and about 4 minutes and is preferably between about 10 seconds and about 3 minutes. The granulated suspended matter resulting from addition of the two flocculating agents in combination with upward flow and stirring within selected limits is entrapped in granulation zone I, while the clean aqueous supernatant is carried upwardly from granulation zone I into supernatant collection zone II and is carried out therefrom through outlet conduit 7. In granulation zone I, substantially spherical particles are formed by the fluidization phenomenon generated by the simultaneous upward and rotational flows imparted to the mother liquor. Excess liquor is discharged from vessel 3 through outlet 8 provided at the top of granulation zone I.

Figure 4:
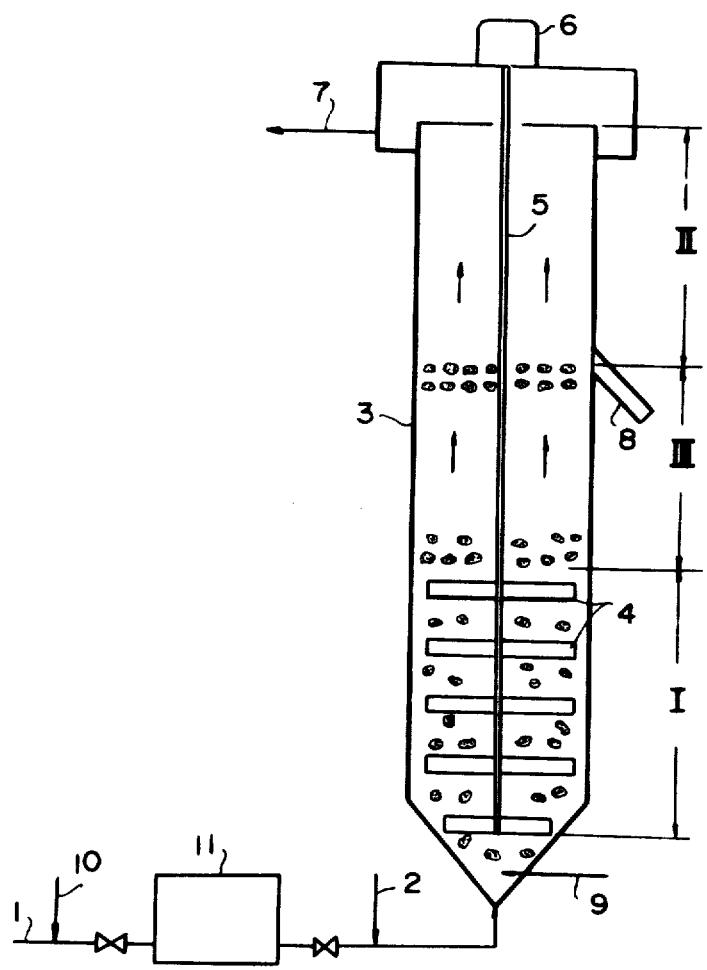

Referring now to FIG. 4, the device illustrated therein is similar to the device shown in FIG. 2 and is particularly adapted for enhancing the purity of the effluent water and removal of color bodies. Vessel 3 in this embodiment includes the three zone interior arrangement, as described in connection with FIG. 2, i.e., an underlying granulation zone I, an intermediate expansion zone III, and an overlying supernatant collection zone II. Additionally, the same prevailing rotating upward flow is provided therein by impellers 4 operatively connected to driving motor 6 through connecting rotor 5. The use of an expansion zone III promotes the formation of a substantially constant layer of fine granulated particles which provide a filtering effect upon the upwardly carried supernatant for thereby obtaining a clearer and more stable supernatant liquor in zone II. The process as described in connection with the embodiment of FIG. 3 for treating an aqueous suspension containing less than 10 g/l of solid metal oxides and hydroxides and/or metal and phosphate ions may thus be carried out even more effectively in the apparatus shown in FIG. 4, wherein like elements are designated by the same number. For instance, in the same way as shown in FIG. 3, precipitation of ions from solution may be promoted in reaction tank 11 by charging the suspension with a chemical reagent introduced therein through charge conduit 10. The only substantial difference between the embodiments shown in FIGS. 3 and 4 is that the vessel is provided with three interior zones rather than two interior zones for obtaining a higher quality supernatant. In modifying the device of FIG. 2, to the device of FIG. 4 to treat aqueous suspensions containing less than 10 g/l of suspended metal hydroxides and/or metal and phosphate ions, the suspension feed conduit 1 is modified to include the reaction tank 11 and reagent charge conduit 10. Additionally, the sequence of addition of OFA and IFA and the holding time in tank 11 and the intervals between addition of precipitant for metal and phosphate ions and addition of OFA, and between addition of OFA and IFA are the same as described in connection with the apparatus of FIG. 3. The internal zone arrangement of the FIG. 4 embodiment otherwise operates in the manner described in connection with FIG. 2, while the processing of the suspension is as substantially described in connection with the FIG. 3 embodiment.

In practicing the process with the apparatus as shown in FIGS. 1-4, the amount of OFA added to the aqueous mother liquor is functionally dependent upon the properties thereof and the optimal amount may be experimentally determined by performing a granulation test on a sample of the liquor under laboratory conditions. According to practical tests on an industrial scale, when about 0.5 - 20 ppm was added to the suspension liquor, the process performed satisfactorily. The amount of IFA agent added to the suspension liquor is similarly functionally dependent upon the properties of the untreated water. It is, however, preferable that the amount of IFA added to the suspension be in the range of from about 10 to about 300 ppm.

In practicing the process on an aqueous suspension of the type described in connection with FIGS. 3 and 4, as aforenoted, the amount of chemical reagent added to the suspension feed stream is determined substantially stoichiometrically according to the quality and quantity of dissolved contaminants in the untreated water. Accordingly, if the quantity of dissolved contaminants is known, the addition ratio may be determined and the optimal amount thereof may be experimentally determined. The addition ratio generally depends upon the concentration of the suspension. If the concentration is low, the addition ratio will be small, but as the concentration increases, then the addition ratio increases. Preferably, the addition ratio ranges from about 5 to about 300 ppm.

The granulated particle concentration in the present invention should be at least 3 times as high as the concentration of suspended solids in the untreated water in order to obtain satisfactory granulation. Thus, it is critical that the concentration of suspended solids in the solid layer of the particle separating device be at least about 3 times as high as the concentration of solids in the untreated suspension. When the fluidized particulate concentration falls below this value, unsatisfactory granulation and separation occur. The preferred concentration of fluidized particles ranges from about 1 g/l to about 150 g/l.

The upward flow rate of the suspension in the treating vessel 3 influences the solids concentration in the granulation zone. The flow rate and the rate of withdrawal of granulated solids should be such as to substantially maintain the solids concentration within the required range. The flow rate of the suspension in the apparatus is also functionally related to the type of suspension to be separated and is preferably in the range of from about 200 mm/min to about 2,000 mm/min. The optimal flow rate may be experimentally determined for individual samples of water to be treated.

The speed of the tips of impellers 4 in the granulation zone also depends on the properties of the untreated water and is preferably in the range of from about 0.05 to about 0.7 m/sec. If the rotation speed of the stirring vanes is too high, regions which are free of solids develop in the blanket layer and particles can penetrate the layer without encountering and being filtered out by the granulated particles. The microfloc particles can then be carried out in the effluent through conduit 7. If the impellers rotate too slowly, the suspended solids do not agglomerate satisfactorily. The optimal impeller rotation speed is dependent upon the quality of the untreated water and the value should be experimentally determined.

When the suspended solids are particularly hydrophilic, the mass of solids is too hydrated for satisfactory granulation thereof even after the additions of OFA and IFA. Granulation thereof requires excessive amounts of said flocculating agents and the process is consequently uneconomical to operate. Under these circumstances, it is preferable to admix the untreated water with a finely divided hydrophobic material having a specific gravity of more than 1.0 and a diameter of less than 200 $\mu$. The hydrophobic material is preferably thoroughly dispersed in the untreated water, with the OFA being admixed therewith so that hydrophobic fines are entrapped within the coagulated solids. The IFA is added thereto for granulating the particles. The hydrophobic fines entrapped in the granulated solids increase the weight thereof, thereby increasing the sedimentation speed of the granulates and provide the satisfactorily dehydrated granules. The combined particles are, therefore, compacted because of the release of moisture therefrom. This method, therefore, is highly effective when hydrophilic solids are to be granulated; it should be noted that clay particles need not be subjected to this procedural modification for satisfactory separation. When the hydrophobic fines have dimensions in a range from about 30 to about 200 $\mu$, the granulated particles may be treated with a classifier such as a wet-type cyclone for removal and collection thereof from the sludge and the hydrophobic fines may be recycled through the treating tank.

Suitable hydrophobic materials which may be employed in the process include sand, clay, pulverized coal, active carbon, fly ash and synthetic resin powder and like hydrophobes having a specific gravity of at least 1.0. The amount of finely divided material which may be added to untreated aqueous suspension is functionally related to the solids concentration therein and generally increases as the solids concentration increases. Particularly satisfactory results are obtained when the amount of hydrophobic material added to the suspension is at least about 10% by weight of solids in the suspension.

The following examples are set forth for illustrative purposes only, to show the operation of the process. It is not intended that these examples limit the scope of the invention, as defined in the claims which follow.

EXAMPLE 1

To untreated water, i.e., mother liquor, having a solids concentration of about 2,000 ppm comprising partially crystalline $\gamma$- FeO(OH) and/or $\gamma$-oxy-ferric oxide was added about 1.5 mg/g-ss* of polyacrylamide, which was admixed therewith. The admixture was subjected to agitation for about 30 sec., and introduced in the granulation zone I of a vessel 3 as illustrated in FIGS. 1-4. About 40 ppm of PAC (aluminum chloride) was then fed therein.

* suspended solid

The treating vessel 3 had the following dimensions, 50 mm diameter × 1,200 mm height and was provided with 10 paddle-shaped impeller blades of about 40 mm in width × 20 mm in height which were mounted in the granulation zone of the tank and rotated therein at a speed of about 100 rpm. (The tip speed of the impellers was about 0.21 m/sec.). The respective heights of the granulation zone and clarification zone were 800 mm and 400 mm, respectively. The collected operation data was as follows:

Upward flow rate: 1,200 – 1,500 mm/min
Concentration of solid component in the fluidized particulate layer: 120 g/l
Diameter of granulated particles: 2 – 3 mm
Total ion component in treated water: 3 ppm
T - ss (Total suspended solid): < 5- 10 ppm
Agitation strength (a measure of the energy input per unit volume per second by the impellers): about 0.68 kg-m/m³sec.

As a reference control, a sample of the untreated water was mixed with the same amount of the same polymer but no PAC (aluminum chloride) was added thereto. Under otherwise identical process conditions, the following data was collected:

Upward flow rate: 400 mm/min
Particulate concentration in the fluidized particulate layer: 20 g/l
T - ss of treated water: 150 ppm.

The sedimentation characteristics if the granulated particles and the clarity of treated water were highly degraded as compared with the water treated according to the process.

A number of other variations in the procedure were attempted as a means of establishing the criticality of the conditions specified. Thus, when the upward flow rate was increased to 2500 mm/min, the suspended solids in the vessel dispersed throughout said processing vessel and the concentration of solids in the fluidized particulate layer decreased to 5 g/l, and the total suspended solids in the supernatant was found to be at a level of 500 ppm, as compared with a level of 5 – 10 ppm in the supernatant extracted according to the procedure set forth in Example 1.

Next, the upward flow rate of water into the processing vessel was set at 800 mm/min. At this upward flow rate, it was observed that the solids concentration of the fluidized particulate layer gradually increased and the sedimented floc within said fluidized particulate layer granulated. The concentration of solids in the fluidized particulate layer reached a final value of 150 g/l, and the granules in the layer had an average diameter of 3 mm, while the total suspended solids in the processed supernatant was measured at 5 ppm.

Finally, all conditions were kept at the levels specified in Example 1 except that the sequence of addition of the flocculating agents, namely OFA and IFA, was reversed. In other words, the aluminum chloride was injected into the raw water first and then polyacrylamide was injected. Under this change in procedure, it was found that none of the γ-FeO (OH) in the raw water was precipitated out, and no particulate layer formed in the granulation section of the processing vessel.

An attempt was made to compensate for the reversal in the sequence of addition of the flocculating agents by decreasing the upward flow rate of water into the processing vessel to 250 mm/min. The formation of a fluidized particulate layer in the granulation zone of the vessel was detected. However, a substantial dispersal of fine floc into the supernatant was observed and the total suspended solids in the treated water was found to be at a level of 200 – 300 ppm as compared with the level of 5 – 10 ppm in the treated water obtained by the procedure set forth in Example 1.

Another modification of the test was carried out in order to determine whether granulation would occur in the absence of rotation of the impellers. The upward flow rate of water into the processing vessel was maintained at the rate specified in Example 1, namely at 1200 – 1500 mmm/min. No agglomeration of flocced suspended solids was observed in the processing vessel, and all solids suspended in the raw water were dispersed into the supernatant. The total suspended solids in the processed water were measured at 2000 ppm. No layer of granulated particles formed in the granulation section of the vessel.

Reduction of the upward flow rate of water into the vessel to 400 mm/min resulted in formation, precipitation and gradual separation of floc into an agglomerate layer in the granulation section of the vessel. However, the agglomerate layer was not fluid and bridging occurred therein. Channeling in the agglomerate floc layer was observed and it was found that water entering the processing vessel short-circuited through the channelled agglomerate layer. Since the raw water in process in the vessel did not pass uniformly through the agglomerate floc layer, and instead passed through the agglomerate floc layer by the route offering the least resistance, the efficiency of the process was reduced and the total suspended solids in the processed water was measured at an unsatisfactory level of 200 – 300 ppm.

An attempt was made to eliminate the briding and channelling phenomena observed in this out-of-specification process by reducing the amount of polyacrylamide added to the vessel to 0.3 ppm. It was immediately observed that there was substantial dispersal of the floc into the supernatant; consequently, the upward flow rate of water into the vessel was reduced to 200 mm/min. With this reduced upward flow rate, floc formation and coagulation resulted, and the total suspended solids in the processed water was measured at a satisfactory level of 5 – 10 ppm. However, the coagulated floc did not granulate in the manner of the procedure set forth in Example 1 and the coagulated floc was a hydrous sludge. In addition, the output rate of the system was severely cut.

As can be seen from the above tests, in the absence of rotational agitation in the vessel, the quantity of high molecular weight flocculating agent added to the water in process cannot exceed 0.5 ppm, and even at that level, the floc collected in the vessel does not granulate properly.

Attention is called to the variable termed "agitation strength", a value of which is given in Example 1. As indicated there, the agitation strength is a measure of the power input to the suspension by the impellers. For a mother liquor containing inorganic contaminants, the agitation strength should lie in the range from 0.2 – 1.0 kg-m/m³sec.

EXAMPLE 2

A processing tank of 100 mm diameter × 1,200 mm height having a granulation zone of about 800 mm in height and a separation zone of about 400 mm in height was provided. A multi-staged agitator comprising 9 paddle-shaped impellers was mounted in the granulation zone, each impeller being about 80 mm wide × 40 mm high. The impellers were rotated at a tip speed of about 0.25 m/sec.

The upward flow rate within the tank was measured at about 500 mm/min.

Air was blown into the untreated water which contained about 100 ppm of $Fe^{2+}$ and ferric hydroxide was precipitated out. To the suspension liquor about 100 ppm of sand having a specific gravity of about 2.6 g/cm$^3$ and a grain diameter of 40 – 200 μ was added under agitation. To the admixture, about 10 ppm of partially hydrolyzed polyacrylamide was added under agitation and the agitated admixture was introduced into the granulation zone of the treating vessel. Twenty ppm of alum was then added thereto for granulating the suspended particles. The data collected during processing was as follows:

Concentration of $Fe^{2+}$: 2ppm
Particulate concentration in the granulation zone: 50 g/l
Diameter of granulated particles: 2 – 3 mm
Agitation strength: About 0.84 kg-m/m$^3$ sec.

Note: The agitation strength is also known as the "G-value". The granulated particles were easily dehydrated by vacuum filtration and the filtered cake contained about 65% moisture.

When the apparatus was operated under the same conditions as above but with no addition of hydrophobic solids, it was difficult to obtain satisfactory granulation at an upward flow rate of about 500 mm/min. When the upward flow rate was reduced to 250 mm/min, the diameter of granulated particles remained at 2 – 3 mm but they were not satisfactorily compacted. The solids concentration in the granulation zone was as low as 15 g/l. Dehydration of the granulated solid was very unsatisfactory and the moisture content of the filter cake was about 87% which compared unfavorably with the moisture content of the filter cake to which the hydrophobic material had been added.

In a further test of the operating limits of the apparatus, the composition set forth in Example 2 was treated in precisely the same way as described in Example 2 with the same additives, except that the amount of partially-hydrolyzed polyacrylamide added to the water in process was reduced to 0.3 ppm while the same amount of alum was added to the water in process. It was observed that with this procedure, no floc layer formed in the granulation zone of the vessel.

The procedure was then modified by omitting the addition of alum to the water in process, and it was observed that the quantity of the processed water degraded substantially, the concentration of ferrous ions being 50 – 60 ppm, a level which is unsatisfactory for many purposes. Moreover, this level of ferrous ions is subtantially higher than when an adequate quantity of alum is used in the treatment of the processed water.

The procedure and composition of Example 2 was again followed, except that the sequence of addition of partially hydrolyzed polacrylamide and alum was reversed. In other words, 20 ppm of alum was added prior to the addition of 10 ppm of partially hydrolyzed polyacrylamide. Under these conditions, no floc layer formed in the granulation section of the vessel. In the attempt to overcome this problem, the upward flow rate of the water into the vessel was reduced to 150 mm/min from 500 mm/min. It was then observed that a particulate layer of solids formed in the granulation zone of the vessel, but the particles did not pelletize and did not granulate. It was also observed that the quantity of fine particles in the treated water increased substantially, and the level of the concentration of ferrous ions in the treated water rose to 20 – 30 ppm.

EXAMPLE 3

A separation chamber was provided; the dimensions thereof were 100 mm diameter × 1,200 mm high. It was provided with a granulation zone of about 600 mm in height, an expansion zone of about 200 mm in height and a supernatant collection zone of about 400 mm in height. An agitator comprising 6 paddle-shaped impellers was mounted in the granulation zone, each impeller being 80 mm in width × 40 mm in height. The impellers were rotated at a tip speed of about 0.08 m/sec or 20 rpm.

Untreated water containing domestic sewage was deaerated for a predetermined period of time and the water quality thereof was: ss, 10 ppm; $PO_4^{-3}$, 4 – 5 ppm; BOD, 15 – 20 ppm. To the water was added about 50 ppm of alum under agitation for about 5 min. To the admixture, about 1.2 ppm of sodium polyacrylate was added under agitation for about 20 sec. and the admixture was fed into the granulation zone, wherein about 15 ppm PAC (aluminum chloride) or alum was introduced into the admixture for granulating solids suspended therein. In this example, the upward flow rate was about 350 mm/min, the solids concentration in the granulation zone was 10 g/l, ss of treated water <3 ppm, BOD <6 ppm, $PO_4^{-3}$ <0.1 ppm, and the formed sludge was easily dehydrated until the moisture content thereof decreased to 85 – 80%.

When to the same sewage water about 70 ppm of alum was added under agitation for 5 – 7 min to form floc and to the admixture the same amount of sodium polyacrylate was added, the following data was collected:

Upward flow rate: 50 mm/min
Particulate concentration in the blanket layer: 700 ppm
Agitation strength: about 0.042 kg-m/m$^3$ sec.
ss of treated water: <7 – 10 ppm
BOD <10 ppm and $PO_4^{-3}$ <0.15 mm.

These values are substantially the same as may be obtained by utilizing a conventional coagulating precipitation method, and are inferior to the values obtained by the instant process.

As further exploration of the limitations on the operating variables, raw water having the composition of the water in Example 3 was treated according to the procedure described in said Example, except that the upward flow rate of the raw water into the processing vessel was increased to 2200 mm/min. It wsas observed that all of the floc which had accumulated in the granulation zone prior to the increase in the upward flow rate dispersed into the supernatant within 15 minutes, thereby contaminating the treated water. Next, the procedure of Example 3 was varied in that after introducing the alum into the water to insolubilize phosphate ions in the water in process, the sequence of addition of the aluminum chloride and sodium polyacrylate into the processing vessel was reversed. It was necessary to reduce the upward flow rate of the water into the processing vessel to 150 mm/min from 350 mm/min because of the fact that excessive amounts of solids dispersed into the supernatant zone, thereby contaminating the treated water. At the reduced upward flow rate of 150 mm/min, the treated water had the following quality: suspended solids, 20 – 30 ppm; BOD, 10 – 15 ppm; phosphate ion concentration 1.5 – 2.0 ppm. These results compared most unfavorably with those obtained according to the procedure set forth in Example 3.

As a further test of the limits of Example 3, the impellers mounted in the processing vessel were removed. It was then observed that the floc in the particulate layer bridged and channelled, as a result of which water introduced into the vessel short-circuited through the channels in the floc layer. The quality of the water treated in this way degraded appreciably and had the following characteristics: suspended solids, 20 – 25 ppm; BOD, 10 – 20 ppm; phosphate ion concentration, 2 – 3 ppm. After this procedure was maintained for a period of time, granular pellets which had previously formed in the vessel ruptured and the average size of granular pellets in the floc layer diminished. After 5 hours of this procedure, the floc layer had completely dissipated.

EXAMPLE 4

A treating chamber was employed having a diameter of 100 mm and a height of 1,200 mm wherein the granulation zone was about 800 mm high and the clarification or supernatant collection zone was about 400 mm high. An agitator comprising 8 paddle-shaped impellers was mounted in the granulation zone, each impeller being 80 mm in diameter × 40 mm in height. The impellers were rotated at a tip speed of about 0.16 m/sec or 4 rpm. The agitation strength was about 0.11 kg-m/m$^3$ sec.

Untreated water comprising domestic sewage was deaerated for a prolonged period of time and had the following water quality: $ss \approx 10 \sim 15$ ppm; $PO_4^{-3}$ ion $\approx 4 \sim 5$ ppm, $BOD \approx 15 \sim 20$ ppm. To the water about 50 ppm of alum was added under agitation for about 3 min. until the reaction therebetween had completed and the reaction product had formed. To the treated water, about 200 ppm of sand having a grain diameter of about 40 – 100 $\mu$ and then 1.2 ppm of polyacrylamide was added under agitation for about 30 sec. The admixture was fed into the graunulation zone wherein about 20 ppm of PAC (aluminum chloride) was introduced thereto for effecting granulation. In this example, the upward flow rate was about 750 mm/min, the solids concentration in the granulation zone was about 55 g/l; ss of treated water <5 ppm, BOD <5 ppm, and $PO_4^{-3}$ <0.3 ppm. The granulated solids obtained thereby were dehydrated by roll-pressing to a cake moisture content of about 68%.

When sand was not added, the tip speed of the impellers was maintained at 0.08 m/sec. (or 20 rpm), and the upward flow rate was about 350 mm/min, while the other process conditions were maintained constant as above, the agitation strength being about 0.012 kg-m/m$^3$ sec; the results obtained were:

Particulate concentration in the granulation zone: 10 g/l
ss of treated water: <5 ppm
BOD: <5 ppm.

The cake obtained by dehydrating the produced sludge had a moisture content of 83%.

When sand was added, the upward flow rate could be controlled at a higher level and the dehydration effected in the granulation zone was superior, but the quality of the treated water did not improve.

EXAMPLE 5

A cylindrical processing vessel having a height of 1200 mm and a diameter of 100 mm was used. The vessel was divided into equal sections for the granulation zone and supernatant zone, each of the sections having a height of 600 mm. In the granulation zone were mounted 8 radially extended paddle-type impellers for rotation. Each impeller had a diameter of 80 mm and a height of 40 mm. The impellers were rotated at 50 rpm and had a tip speed of 0.21 m/sec. Raw water consisting of residual waste water from a hot steel rolling mill was introduced into the bottom of the vessel at an upward flow rate of 800 mm/min. The waste water had a suspended solids content of 53 ppm. Into this waste water 1.0 ppm of polyacrylamide was introduced and the water having the polyacrylamide therein was agitated for 30 seconds. After the 30 second agitation period, 20 ppm of aluminum sulphate were introduced into the water which was again agitated for 2 seconds. After the 2 second period of agitation, all of the prior treatment having taken place exterior to the vessel, the water was discharged into the granulation zone of the vessel. After treatment, the total suspended solids content was less than 5 ppm. The solids concentration in the fluidized particulate layer in the granulation zone had a concentration of 70 g/l, and the size of the granular particles in the layer had a diameter of 2 – 3 mm.

When the experimental procedure was changed in that the sequence of addition of the flocculating agents into the raw water was reversed, 20 ppm of aluminum sulphate being introduced first and agitated for 30 seconds after which 1.0 ppm of polyacrylamide was introduced and agitated for 2 seconds, the agitated water then being discharged into the granulation zone of the vessel, the process deteriorated substantially completely. The water treated according to this latter procedure was degraded below satisfactory levels. In another modification of the procedure, the upward flow rate of water into the vessel was decreased to 250 mm/min. At this low upward flow rate, the concentration of solids in the particulate layer fell to 8 g/l, and the flocced particles within the fluidized layer failed to granulate, remaining in the layer as discrete flocced particles. The total suspended solids concentration in the water treated according to this procedure was measured at 5 ppm.

In yet another variation of the experimental procedure of the last Example, raw water having substantially the same high iron content was agitated for 30 seconds with 1.0 ppm of polyacrylamide and then introduced into the granulation section of the vessel for upward flow. The upward flow rate was adjusted to 350 mm/min. Although a fluidized layer of particles was formed in the granulation section of the vessel, the solids concentration within that layer was found to be only 5 g/l, and the level of suspended solids in the treated water was found to be 30 – 35 ppm, a completely unsatisfactory value.

EXAMPLE 6

A cylindrical processing vessel having a height of 1200 mm and a diameter of 100 mm was constructed. The vessel was divided into an 800 mm high granulation zone and a 400 mm high supernatant zone. The granulation zone contained 8 radially-extending paddle-type rotatable impellers mounted on a rotatable shaft. The diameter of the impellers was 80 mm. The height of the impellers was 40 mm. The impellers were rotated at 60 rpm and had a tip speed of 0.25 m/sec.

Raw water was taken from a hot copper rolling mill, the raw waste water having a suspended solids copper content of 35 - 45 ppm. Into this waste water was introduced 1.2 ppm of partially hydrolyzed acrylamide, and the waste water having the acrylamide therein was agitated for 20 seconds. After the 20 second agitation period, 20 ppm of aluminum chloride were introduced into the water, and the composition was then introduced into the processing vessel. A blanket layer formed within the granulation section, the fluidized mass having a solids content of 85 g/l. The fluidized mass of particles in the particulate layer were found to granulate and the granular pellets were found to have average diameters of 2 - 3 mm. The processed water had a total suspended solids concentration of 2 - 3 ppm, a completely satisfactory level of impurity.

However, when the above procedure was modified by omitting the aluminum chloride, the particulate material in the granulation section of the vessel ruptured and sedimented floc did not granulate. In a subsequent test, the sequence of addition of partially hydrolyzed acrylamide and aluminum chloride into the processing vessel was reversed. Specifically, 20 ppm of aluminum chloride were introduced into the raw water and the water was agitated for 30 seconds, after which 1.5 ppm of the acrylamide were added to the water and the water then introduced into the granulation section of the vessel. The rate of rotation of the impellers was set at 50 rpm whereby the tip speed of the impellers was reduced to 0.21 m/sec. The upward flow rate of the water through the processing vessel was also adjusted to 500 mm/min. No layer of particulate matter formed in the granulation zone under this modification of the procedure, demonstrating that reversal of the addition of the flocculating agents results in failure of the procedure.

In another variation of the procedure, the upward flow rate of the raw water into the vessel was reduced to 250 mm/min. At this reduced upward flow rate, a layer of particulate matter formed in the granulation zone and the solids concentration level thereof was measured at 7 g/l while the total concentration of suspended solids in the supernatant was measured at 4 - 5 ppm. However, the particulate mass formed in the granulation zone of the vessel did not granulate or pelletize.

EXAMPLE 7

A cylindrical processing vessel having a height of 1400 mm and a diameter of 100 mm was employed. The vessel was divided into an 800 mm high supernatant zone at the upper part thereof and a 600 mm granulation zone at the lower part thereof. The impellers in the granulation zone had a diameter of 80 mm and a height of 40 mm. The impellers were rotated at 50 rpm and thus had a tip speed of 0.21 m/sec.

The water to be processed was residual waste water which had been used to scour zinc; the concentration of suspended solids, mostly zinc oxide, therein was 150 ppm. Into this residual waste water was introduced 2 ppm of polyacrylamide, and the water was agitated for 35 seconds. After the agitation period 20 ppm of aluminum chloride were introduced into the waste water and the waste water was then lead into the granulation zone of the processing vessel through the bottom thereof. The upward flow rate of the water was 700 - 750 mm/min.

After treatment, the effluent processed in accordance with the above procedure was found to have a total suspended solids content of 8 - 10 ppm, while the solids concentration in the blanket layer of the granulation zone had a concentration of 65 g/l. The size of the pelletized granules in said layer had an average diameter between 2 and 3 mm.

In subsequent tests, the addition of either the polyacrylamide or the aluminum chloride into the effluent was omitted. In both cases, it was observed that the quality of the treated water degraded severely and after 5 minutes of the alternate stoppage of the flocculating agents into the effluent, the concentration of suspended solids in the treated water rose to 40 - 50 ppm. After 30 minutes of this procedure, the concentration of suspended solids in the treated water rose to 150 - 200 ppm. Moreover, after 30 minutes of this procedure, the particulate layer deteriorated and floc dispersed into the supernatant above.

The procedure of the last example was then repeated except that the sequence of addition of the aluminum chloride and polyacrylamide into the vessel was reversed, the aluminum chloride being added first and the polyacrylamide subsequently. With an upward flow rate through the vessel of 700 - 750 mm/min, no fluidized layer of particulate matter formed in the granulation section of the vessel, and the floc particles dispersed throughout the vessel.

This last procedure was then modified in that the upward flow rate of effluent through the vessel was decreased to 200 mm/min. At that level of upward flow rate, a fluidized layer of particulate matter formed in the granulation section of the vessel. However, the concentration of solids in said layer was found to be only 5.5 g/l and the total suspended solids in the treated water were measured at a level of 5 - 10 ppm. However, the mass of particles in the fluidized layer did not pelletize or granulate.

EXAMPLE 8

To determine the effect of the procedure when carried out in accordance with the present invention, the vessel of the last Example was used for treating effluent water having a high aluminum content. The starting effluent had a pH of 4; accordingly sufficient caustic soda was added thereto to raise the pH of the effluent to 7.5. The effluent was then subjected to agitation for 2-3 minutes in order to complete the reaction of aluminum ions and caustic soda to produce aluminum hydroxide. To the suspension thus produced, 1.0 ppm of sodium polyacrylate was added and the admixture was subjected to agitation for 40 seconds. After the 40 second agitation period, aluminum chloride was added to the mixture, and the mixture was discharged into the bottom of the granulation zone of the vessel at an upward flow rate of 300 mm/min. The velocity of the impellers was set to 40 rpm so that the impeller tip speed was 0.15 m/sec. The total solids content of the treated water was found to be 2 - 3 ppm, a most satisfactory result.

When this last procedure was modified by stopping the addition of either the sodium polyacrylate or the aluminum chloride to the mixture, it was observed that the quality of the treated water degraded severely and none of the floc formed in the mixture precipitated or separated in the granulation zone. The floc formed in the mixture became dispersed throughout the vessel, contaminating the supernatant liquid.

In a subsequent test, the normal process procedure was re-established, but the sequence of addition of the aluminum chloride and sodium polyacrylate was reversed. Under this procedure, it was observed that agglomerates formed in the particulate layer but that these ruptured and the total suspended solids in the processed water was measured at a level of 500 - 1000 ppm.

Decreasing the upward flow rate of the effluent into the vessel to 50 - 60 mm/min resulted in a solids concentration in an agglomerate layer measured at 2 - 3 g/l. The total suspended solids in the treated water dropped to 5 - 10 ppm.

EXAMPLE 9

For the treatment of water having a high magnesium hydroxide content, a cylindrical processing vessel having a height of 1200 mm and a diameter of 100 mm was used. The vessel was divided into an 800 mm high granulation zone and a 400 mm high supernatant zone. In the granulation zone were mounted 6 radially-extending paddle-type impellers. The impellers had a combined diameter of 80 mm and a height of 40 mm. The impellers were rotated at 30 rpm and thus had a tip speed of 0.12 m/sec.

Enough slaked lime was added to the raw water to bring the pH thereof to 10.5 - 11.0 so as to precipitate magnesium ions as magnesium hydroxide. Into this magnesium hydroxide-containing effluent were introduced 1.5 ppm of polyacrylamide, the effluent then being agitated for 15 seconds, and 10 ppm of aluminum sulphate. The effluent containing the OFA and IFA was introduced into the granulation zone of the vessel. After processing, the total suspended solids content of the effluent was found to be 5 - 10 ppm while the solids concentration in the fluidized particulate layer in the granulation zone had a concentration of 15 g/l.

As in the other Examples, when either of the two flocculating agents was not used, or when the order of addition was reversed, the procedure completely failed. At an upward flow rate of 400 mm/min, no layer of agglomerate formed in the granulation section of the vessel.

The test was continued further, reducing the upward flow rate to 100 mm/min. At that upward flow rate, a fluidized layer of particulate matter formed in the granulation section of the vessel. The concentration of solids in the particulate layer was found to be 4 - 5 g/l and the total suspended solids in the treated water was measured at a level of 5 - 10 ppm. However, the capacity of the process to treat effluent was reduced to one-fourth the capacity of the system for processing the same type of effluent as disclosed in Application Ser. No. 481,948, now abandoned.

Reference has been made to color in the raw water, this being a matter for concern since color materials which may originate in dyes or other colorants from specific processes would color the purified water if not removed. In general, the color materials may be present in the colloidal suspension and contain both organic and inorganic materials. The process disclosed herein successfully removes virtually all of the color materials.

According to the present invention, a suspension liquor having a solids concentration of less than 10 g/l and containing particularly metal ions and phosphate ions and suspended metal hydroxide and metal oxides etc. and the like is admixed with at least 0.5 ppm of an organic high molecular weight flocculating agent and at least 10 ppm of an inorganic metal salt flocculating agent, the resulting admixture having a solids concentration of at least 1 g/l, the admixture being carried upwardly through a rotating layer of solids fluidized by the stirring impellers for generating a rotating current therein for promoting intimate solid-liquid and solid-solid contact for thereby granulating the particles and providing a compact agglomerate of substantially spherical particles derived from a dilute suspension liquor. The process clarifies the liquor and separates suspended solids therefrom at a separation speed of about 5 - 10 times faster than the conventional high-speed coagulation/precipitation processes. The sludge produced thereby is comprised of granulated solids which are highly condensable and easily dehydrated. Sludge produced by the process is easily treated and the process itself may be practiced in a compact, inexpensive apparatus. Moreover, the process is extremely economical to operate, while substantially eliminating residual high molecular weight flocculating agent from the clarified supernatant for thereby preventing secondary pollution when the supernatant is recycled.

It will thus be seen that the objects set forth above, among those made apparent from the preceding description, are efficiently attained and, since certain changes may be made in carrying out the above process and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A water-clarification process for separating suspended metal oxide and metal hydroxide solids from a mother liquor which may also contain metal ions and phosphate ions, the concentration of suspended solids being less than 10 g/l of said mother liquor, comprising the steps of adding to said mother liquor a high molecular weight organic flocculating agent, hereinafter referred to as "OFA", said OFA being selected from the group of polymers consisting of polyacrylamide, partially hydrolyzed polyacrylamide, and sodium polyacrylate, said polymer having a molecular weight between 500,000 and 6,000,000 in an amount sufficient for coagulating said solids, holding said OFA-treated mother liquor for a period sufficient for completion of coagulation, adding to said mother liquor containing coagulated solids after completion of coagulation an inorganic metal salt flocculating agent, hereinafter referred to as "IFA", passing essentially the entire quantity of said OFA- and IFA-treated mother liquor through an apparatus in an upward direction, said apparatus having in the lower section thereof a blanket layer of granulated solids formed from said coagulated solids, the concentration of granulated solids being from a lower limit of 3 times the concentration of suspended solids in the said mother liquor to an upper limit of 150 g/l, agitating said mother liquor impart a rotational flow thereto by means of an impeller on a vertical rotating shaft at a rate sufficient to bring coagulated solids into mutual contact and into contact with formed granules to form granules and larger granules, said agitation rate being below that at which said blanket layer is disrupted, the tip speed of said impeller lying between 0.05 and 0.7 m/sec., drawing off said granulated solids from said blanket layer at a rate such as to maintain the concentration of granular solids in said blanket layer within said limits, and drawing off clarified water above said blanket layer, said IFA being added in an amount effective in combination with said agitation for granulating said coagulated solids.

2. The water-clarification process as defined in claim 1, wherein said IFA is selected from the group consisting of aluminum sulfate, polyaluminum chloride, ferric sulphate, ferric chloride, ferrous sulphate and magnesium carbonate.

3. The water-clarification process as defined in claim 1, wherein the quantity of IFA added is between 10 and 300 ppm.

4. The water-clarification process as defined in claim 1, wherein the quantity of OFA added is between 0.5 and 20 ppm.

5. The water-clarification process as defined in claim 1, wherein said mother liquor is agitated during said holding period.

6. The water-clarification process as defined in claim 1, wherein the solids concentration in said blanket layer is maintained in the range from 1 g/l to 150 g/l.

7. The water-clarification process as defined in claim 1, wherein the agitation strength of said impeller lies between 0.2 and 1.0 kg-m/m$^3$sec.

8. The water-clarification process as defined in claim 1, wherein the rate of upward flow of said treated liquor in said apparatus is between 200 and 2000 mm/min.

9. The water-clarification process as defined in claim 1, further comprising the step of dispersing in said mother liquor prior to said treatment with OFA an effective amount of a substantially hydrophobic water-insoluble particulate material having a specific gravity of at least 1 and a particle size of up to and including 200 microns, said dispersing step being of assistance in granulating particularly hydrophilic solids.

10. The water-clarification process as defined in claim 9, wherein the average particle size of said hydrophobic particulate material is from about 30 to about 200 microns.

11. The water-clarification process as defined in claim 9, wherein said hydrophobic particulate material is selected from the group consisting of sand, clay, carbon, activated carbon, fly ash, and powdered synthetic resin.

12. The water-clarification process as defined in claim 9, wherein said amount of hydrophobic particulate material is at least 10% of the weight of colloidally-suspended solids.

13. The water-clarification process as defined in claim 1, wherein said mother liquor contains dissolved matter selected from the group consisting of metal ions, and phosphate ions and further comprising the steps of adding in essentially a stoichiometric amount a chemical reagent for precipitating said ions from said mother liquor, said reagent being selected from the group consisting of slaked lime, sodium carbonate, aluminum sulfate, ferric chloride, ferrous sulfate, oxygen, air and chlorine in an amount sufficient to precipitate said ions, and holding said mother liquor with said reagent for a period sufficient for precipitation of said ions, said reagent addition and holding steps being carried out prior to said addition of said OFA.

* * * * *